US009550466B2

United States Patent
Gandhi (10) Patent No.: US 9,550,466 B2
(45) Date of Patent: Jan. 24, 2017

(54) MORPHING ENERGY ABSORBER SYSTEM FOR A VEHICLE ASSEMBLY

(71) Applicant: Toyota Motor Engineering & Manufacturing North America, Inc., Erlanger, KY (US)

(72) Inventor: Umesh N. Gandhi, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 212 days.

(21) Appl. No.: 14/197,466

(22) Filed: Mar. 5, 2014

(65) Prior Publication Data
US 2015/0251617 A1    Sep. 10, 2015

(51) Int. Cl.
*F16F 7/12* (2006.01)
*B60R 21/04* (2006.01)
*F16F 7/00* (2006.01)

(52) U.S. Cl.
CPC ............. *B60R 21/0428* (2013.01); *F16F 7/12* (2013.01); *F16F 7/003* (2013.01)

(58) Field of Classification Search
CPC ........ B60R 21/0428; B60R 21/04; F16F 7/12; F16F 7/003
USPC ............................... 188/371, 377, 267.2, 268
See application file for complete search history.

(56) References Cited

U.S. PATENT DOCUMENTS

| | | | |
|---|---|---|---|
| 6,530,564 B1 * | 3/2003 | Julien ................. | A43B 13/186 267/147 |
| 6,568,743 B1 * | 5/2003 | Jayasuriya ......... | B60N 2/42727 296/153 |
| 6,955,391 B1 | 10/2005 | Peng | |
| 6,962,245 B2 | 11/2005 | Ray et al. | |
| 7,140,478 B2 * | 11/2006 | Barvosa-Carter ...... | B61G 11/12 188/267 |
| 7,547,062 B2 | 6/2009 | Melz et al. | |
| 7,810,602 B2 * | 10/2010 | Evans .................. | B60R 21/045 180/274 |
| 7,822,522 B2 | 10/2010 | Wereley et al. | |
| 8,292,048 B2 | 10/2012 | Battlogg et al. | |
| 8,439,420 B2 | 5/2013 | Cantor et al. | |
| 8,733,819 B1 * | 5/2014 | Le ......................... | B60J 5/0451 296/146.6 |
| 9,180,830 B1 * | 11/2015 | Faruque ............. | B60R 21/0428 |
| 2002/0195833 A1 * | 12/2002 | Fukutomi ............. | B60J 5/0425 296/146.6 |
| 2004/0140169 A1 * | 7/2004 | Shimoda ................. | B60R 21/04 188/377 |
| 2004/0195815 A1 * | 10/2004 | Browne ................ | B60R 21/04 280/753 |
| 2009/0226691 A1 * | 9/2009 | Mankame ............ | D07B 1/0673 428/222 |

(Continued)

FOREIGN PATENT DOCUMENTS

DE         19860249 C1    7/2000
DE    102006003365 A1 *  8/2007 ......... B60R 21/0428

(Continued)

*Primary Examiner* — Nicholas J Lane
(74) *Attorney, Agent, or Firm* — Christopher G. Darrow; Darrow Mustafa PC (57) ABSTRACT

A morphing energy absorber system includes an energy absorbing structure and an actuator system within the energy absorbing structure to morph the energy absorbing structure.

22 Claims, 6 Drawing Sheets

(56) References Cited

U.S. PATENT DOCUMENTS

| | | | |
|---|---|---|---|
| 2009/0267339 A1* | 10/2009 | Usoro | B60R 22/4676 280/807 |
| 2012/0043783 A1* | 2/2012 | Todd | B60J 5/042 296/187.03 |
| 2013/0006471 A1 | 1/2013 | Kirmsze | |

FOREIGN PATENT DOCUMENTS

| | | | |
|---|---|---|---|
| JP | 4664694 | 4/2011 | |
| JP | WO 2013065158 A1 * | 5/2013 | B60R 21/0428 |

* cited by examiner

MORPHING ENERGY ABSORBER SYSTEM FOR A VEHICLE ASSEMBLY

BACKGROUND

The present disclosure relates generally to vehicle assemblies and, more particularly, to a morphing energy absorber system for a vehicle assembly.

Vehicle structures such as doors are typically constructed with an exterior panel and an inner panel that provides structural support. A trim panel is usually fastened to the inner door panel adjacent to the passenger compartment to conceal internal door components and provide aesthetic qualities and ergonomic features.

To lessen the effects of a collision type impact to the vehicle occupant seating area, some vehicle assemblies may include a door intrusion guard beam and bolsters of foam or honeycomb construction to provide energy absorption. Although effective, the energy absorption of such structures is necessarily directed to a generally mid-sized occupant and may be too rigid for a relatively small statured occupant or too soft for a relatively large statured occupant.

SUMMARY

A morphing energy absorber system and a method of morphing a crush space of a vehicle are disclosed. The system includes an actuator system within an energy absorbing structure to morph the energy absorbing structure. The energy absorbing structure is thereby morphed to adjust the crush space thereof and more effectively cushion an occupant.

A morphing energy absorber system for a vehicle according to one disclosed non-limiting embodiment of the present disclosure includes an energy absorbing structure and an actuator system within the energy absorbing structure to morph the energy absorbing structure.

An energy absorbing vehicle structure according to another disclosed non-limiting embodiment of the present disclosure includes a trim panel; an energy absorbing structure adjacent to the trim panel; and an actuator system within the energy absorbing structure to morph the energy absorbing structure.

A method of morphing a crush space within an energy absorbing vehicle assembly, according to one disclosed non-limiting embodiment of the present disclosure includes morphing an energy absorbing structure.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
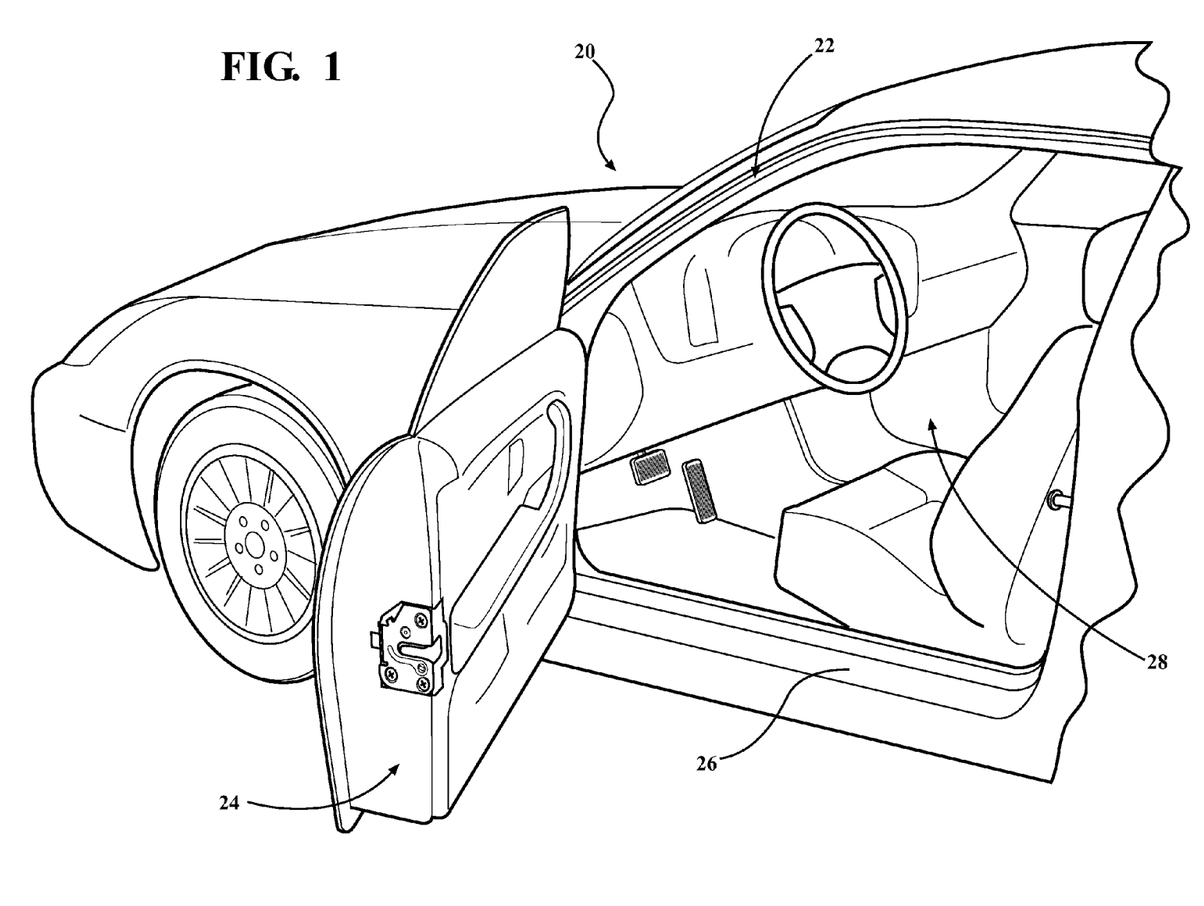
FIG. 1 is a partial perspective view of a vehicle occupant compartment.

FIG. 1 schematically illustrates selected portions of a vehicle 20. The vehicle 20 generally includes a body 22 with a door 24 movable relative to the body 22. The door 24 is schematically illustrated in operational relationship with a rocker panel 26 of the vehicle 20 and an occupant seating area 28. Although a driver's door is illustrated as the example energy absorbing vehicle assembly in the disclosed non-limiting embodiment, it should be appreciated that other vehicle assemblies adjacent to an occupant such as a dashboard will also benefit herefrom.

Figure 2:
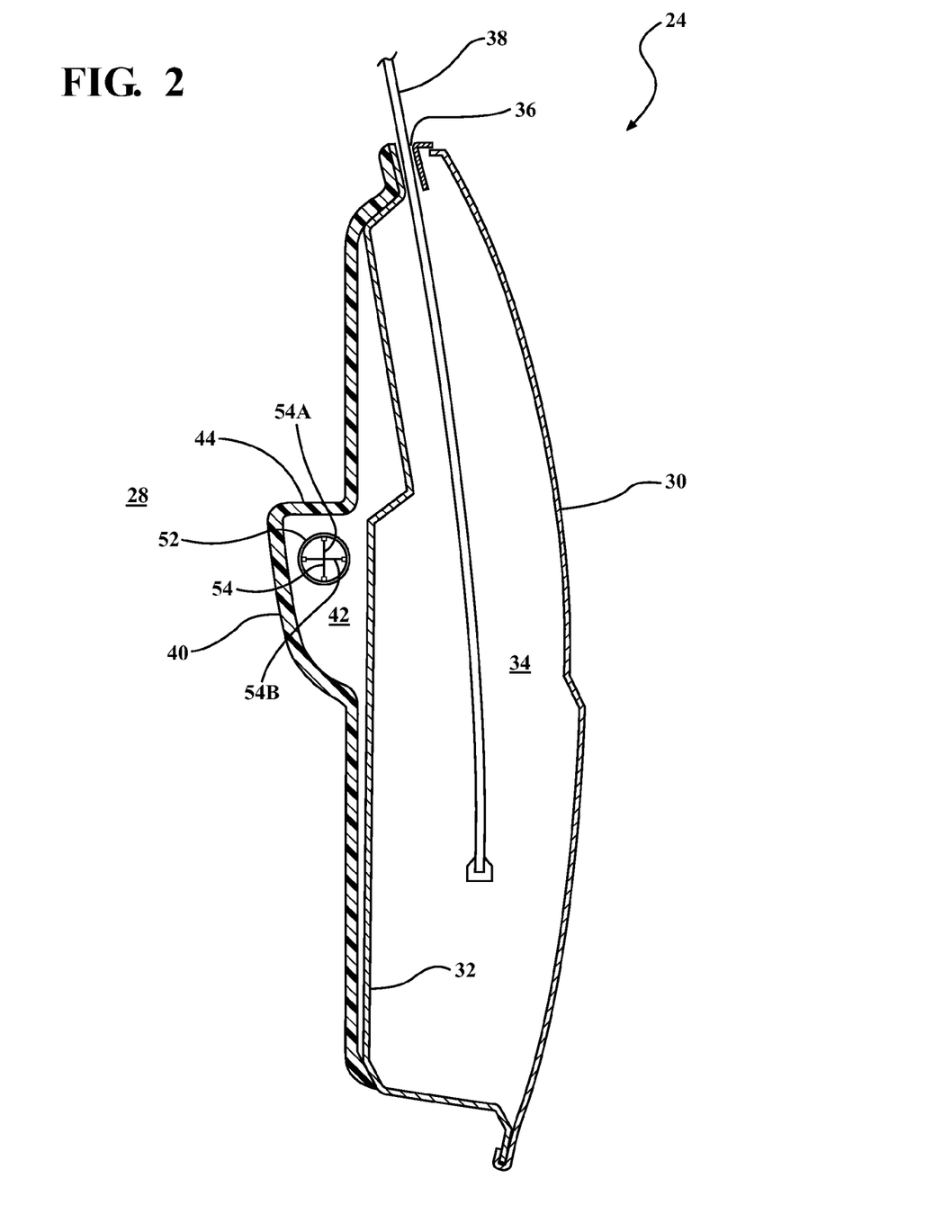
FIG. 2 is a sectional view of a vehicle assembly with a morphing energy absorber system.

With reference to FIG. 2, the energy absorbing vehicle door 24 includes an outer panel 30 and an inner panel 32 joined together in conventional fashion to form a space 34 therebetween. The door 24 also includes an aperture 36 for a window 38, which may move in and out of the space 34. A window regulator device, a door latch, and other components (not shown) of a vehicle door as known may also be housed in space 34.

The energy absorbing vehicle door 24 further includes a door trim panel 40 mounted on the inner panel 32 to form a space 42 therebetween. The door trim panel 40 may define an arm rest 44 or other aesthetic or functional structure that generally faces the occupant seating area 28. The trim panel 40 may be fixedly secured to the inner panel 32 by suitable fasteners such as Christmas tree type fasteners, push pins, or others.

The outer panel 30 and inner panel 32 may be manufactured of a metal material or other suitable materials while the door trim panel 40 is typically manufactured of a non-metal material such as plastic, cloth, vinyl, leather, carpeting, cardboard, wood fiber, or combinations thereof.

Figure 3:
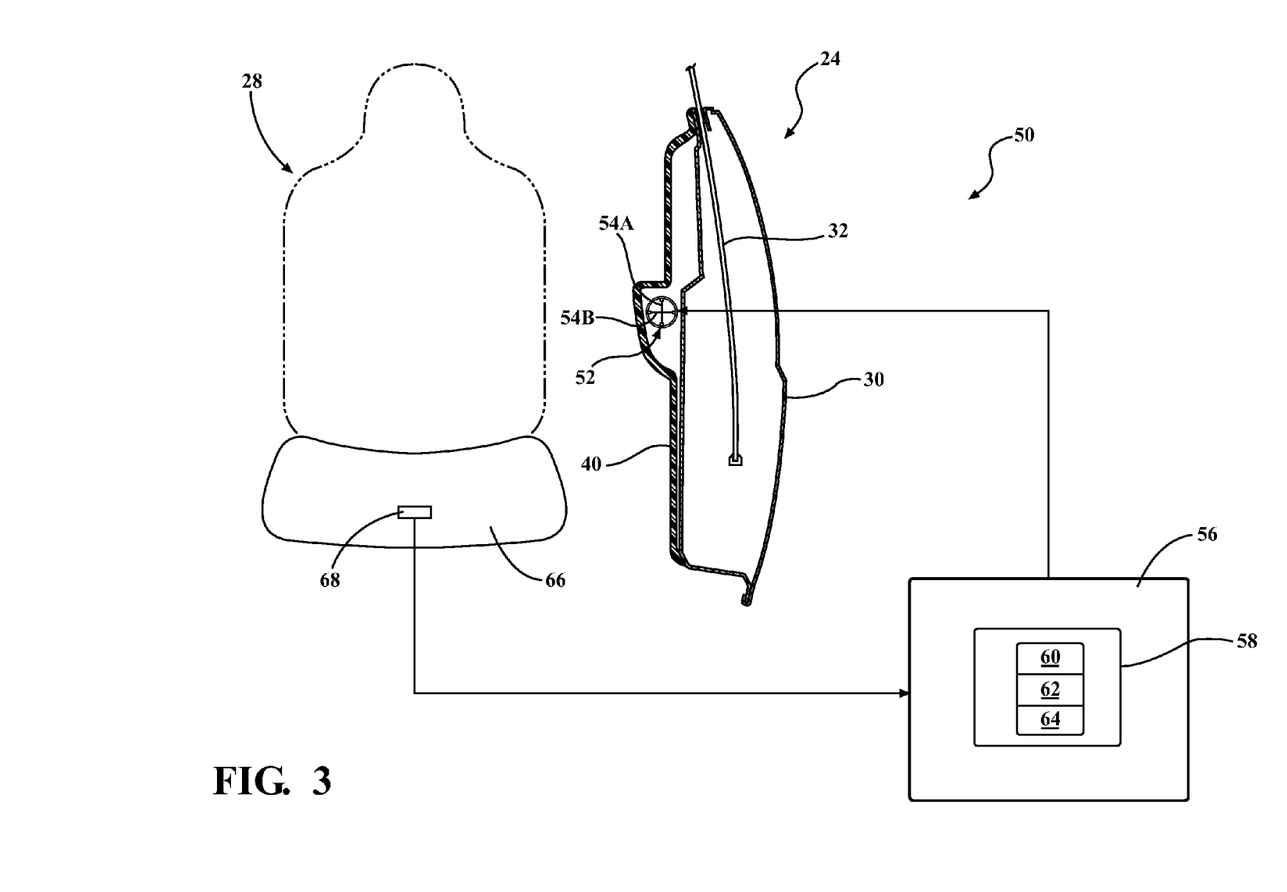
FIG. 3 is a schematic view of the morphing energy absorber system.
Figure 4:
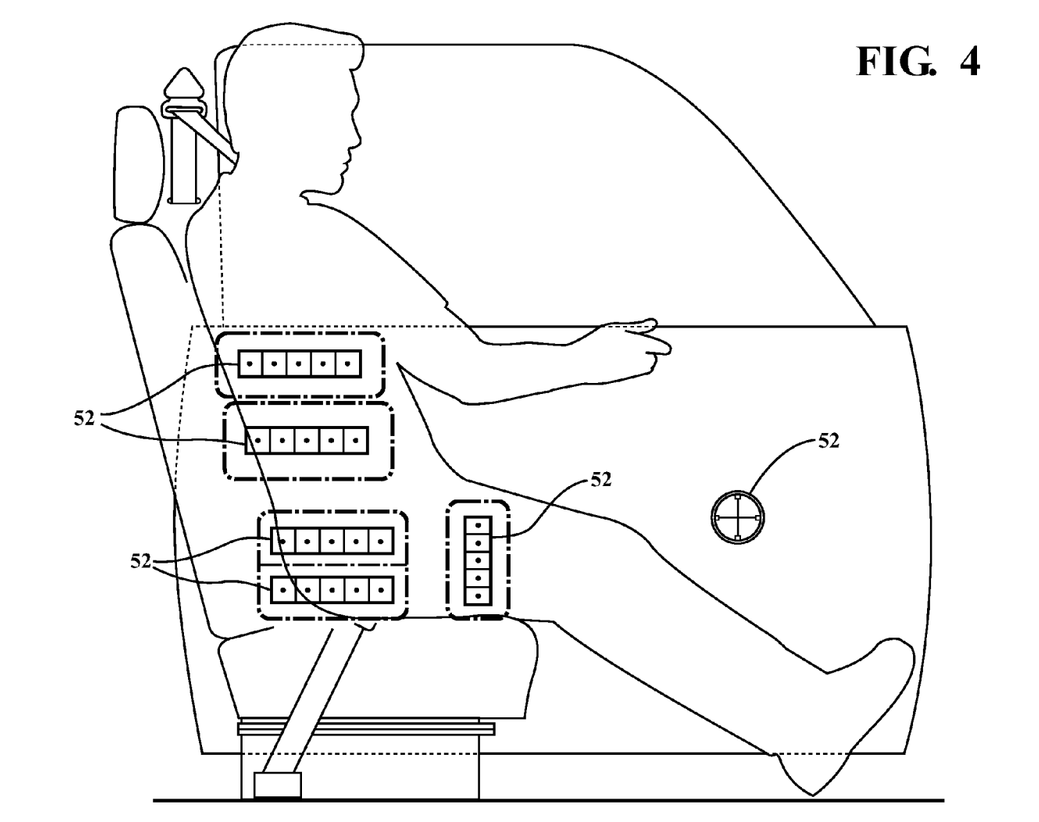
FIG. 4 is a phantom view of a vehicle assembly with example locations for the morphing energy absorber system.

With reference to FIG. 3, the vehicle 20 includes at least one morphing energy absorber system 50. In one disclosed non-limiting embodiment, each morphing energy absorber system 50 includes an energy absorbing structure 52 with an actuator system 54 therein. The actuator system 54 is operable to morph the shape of the energy absorbing structure 52 in response to a control 56. It should be appreciated that one or more energy absorbing structures 52 may be located adjacent a shoulder, knee, head or other body part of the occupant within for example, the vehicle door 24 within the space 42 between the inner panel 32 and the trim panel 40 (FIG. 4).

The energy absorbing structure 52 may be manufactured of mild steel alloys, aluminum alloys, composites and other materials that absorb energy in response to an impact via crush or deformation such as that manufactured by O-Flex Automotive of Tennessee USA. It should be appreciated that although the energy absorbing structure 52 is illustrated as circular in cross-section in a neutral condition and oval in cross-section in a morphed condition, other cross-sections will also benefit herefrom such as oval, rectilinear, polygonal, irregular and others will also benefit herefrom.

The actuator system 54 may be manufactured of a suitable active material that includes, without limitation, shape memory alloys (SMA), ferromagnetic shape memory alloys (MSMA), electroactive polymers (EAP), piezoelectric materials, magnetorheological (MR) elastomers, electrorheological (ER) elastomers, electrostrictive materials, magnetostrictive materials, and the like typically manufactured of multiple of copper-aluminum-nickel, nickel-titanium (NiTi) alloys, iron-manganese-silicon, and copper-zinc-aluminum. Dependent on the particular active material, the activation signal from the control 56 can take the form of, without limitation, an electric current, an electric field (voltage), a temperature change, a magnetic field, a mechanical loading or stressing, such as stress induced superelasticity in SMA, a chemistry or pH change, and the like.

The control 56 generally includes a control module 58 with a processor 60, a memory 62, and an interface 64. The control module 58 may be a portion of a central vehicle control, a stand-alone unit or other system. The processor 60 may be any type of microprocessor having desired performance characteristics. The memory 62 may include any type of computer readable medium that stores the data and control algorithms described herein such as those that morph the energy absorbing structure 52. The operational software for the processor 60 may also be stored in the memory 62. It should be appreciated that the interface 64 may also include communication with sensor systems such as a weight sensor 68 within a vehicle seat 66.

Figure 5:
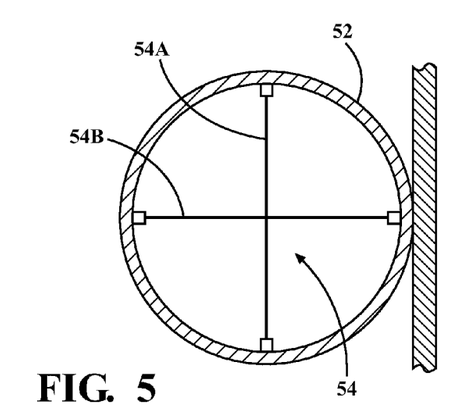
FIG. 5 is a sectional view of an energy absorbing structure in a neutral condition.

With reference to FIG. 5, the actuator system 54 generally includes a multiple of generally vertically arranged first actuators 54A and a multiple of generally horizontally arranged second actuators 54B. It should be appreciated that relative positional terms such as "horizontal" and "vertical" are with reference to the normal operational attitude of the vehicle and should not be considered otherwise limiting. Further, the first actuators 54A and the second actuators 54B may be arranged at various axial positions along the length of the energy absorbing structure 52 as well as intermediate circumferential positions such as diagonal with respect to the first actuators 54A and the second actuators 54B.

Figure 6:
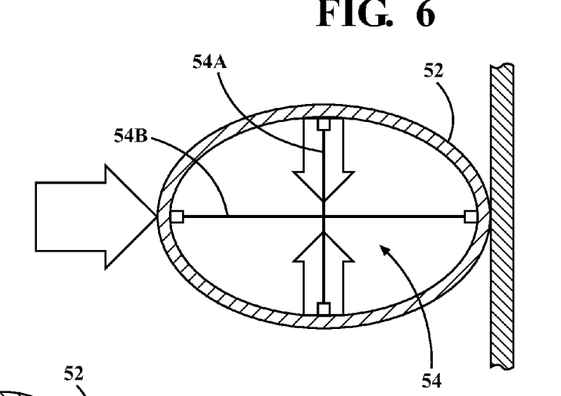
FIG. 6 is a sectional view of the energy absorbing structure of FIG. 5 in a morphed condition for a relatively larger occupant.
Figure 7:
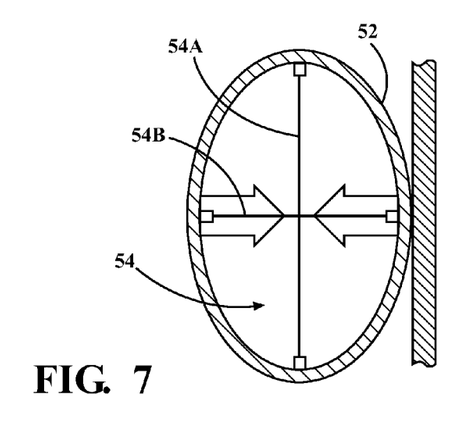
FIG. 7 is a sectional view of the energy absorbing structure of FIG. 5 in a morphed condition for a relatively smaller occupant.

Selective actuation of the first actuators 54A results in contraction thereof and the generally elastic deformation of the energy absorbing structure 52 to elongate the energy absorbing structure 52 in the horizontal plane (FIG. 6). Likewise, selective actuation of the second actuators 54B results in contraction thereof and the generally elastic deformation of the energy absorbing structure 52 to elongate the energy absorbing structure 52 in the vertical plane (FIG. 7).

Figure 8:
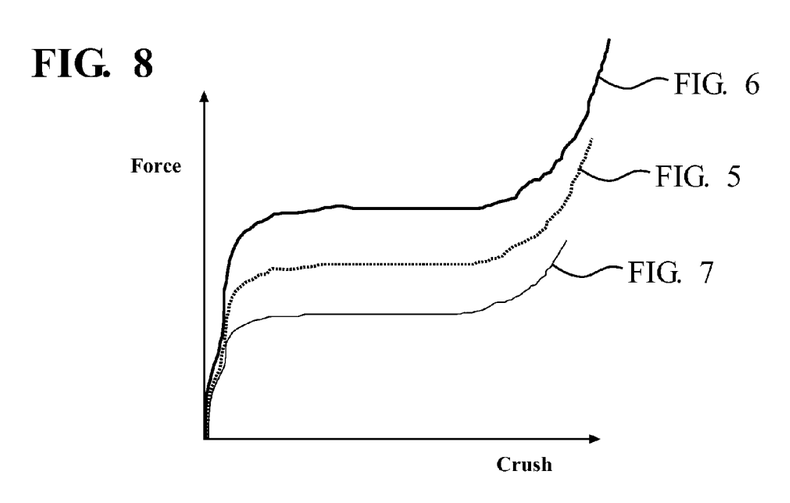
FIG. 8 is a graphical representation of the crush force provided for the energy absorbing structure in the conditions illustrated in FIGS. 5-7.
Figure 9:
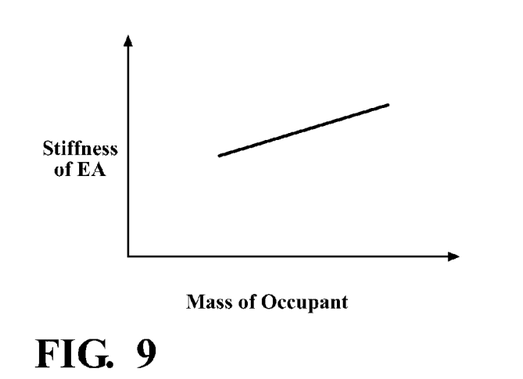
FIG. 9 is a graphical representation of the stiffness required relative to an occupant mass.

The selective elongation morphs the crush space defined by the energy absorbing structure 52. In one example, the actuator system 54 generate a force of about 1500-3000 Newtons to deform an energy absorbing structure 52 of about 40 mm in diameter by about 6%-10%. Such deformation facilitates morphing of the energy absorbing structure 52 to vary the crush space with respect to, for example, an occupant's weight (FIG. 8). That is, for a given crush space the acceleration is fixed which means for a greater mass, e.g., a larger occupant, the crush force provided by the energy absorbing structure 52 is to be relatively higher (FIG. 9). In other words, acceleration, i.e, potential occupant injury, is inversely proportional to crush space.

Figure 10:
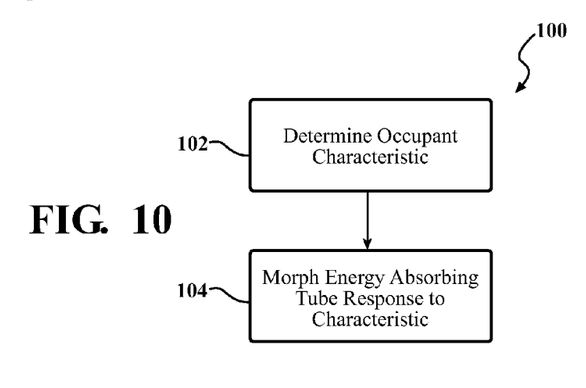
FIG. 10 is an algorithm for operation of the morphing energy absorber system.

With reference to FIG. 10, in one disclosed non-limiting embodiment, the functions of a control algorithm 100 are disclosed in terms of block diagrams, and it should be appreciated by those skilled in the art with the benefit of this disclosure that these functions may be enacted in dedicated hardware circuitry or programmed software routines capable of execution in a microprocessor based electronics control embodiment such as control 56 (FIG. 3).

The control 56 is operable to identify a weight, size or other characteristic of an occupant in the associated occupant seating area 28 (step 102; FIG. 9). The characteristics of the occupant may be determined through, for example, the weight sensor 68 or other sensor input within the vehicle seat 66.

Next, the control 56 provides an activation signal to the actuator system 54 to morph the energy absorbing structure 52 in a desired manner in response to the sensed characteristics of the occupant in the associated occupant seating area 28 (step 104; FIG. 8). For example, for a relatively large and heavy occupant, the first actuators 54A are actuated to increase the resultant crush force of, for a relatively small and light occupant, the second actuators 54B are actuated to reduce the resultant crush force. The energy absorbing structure 52 is thereby morphed to adjust the crush space thereof and more effectively cushion the occupant. It should be appreciated that the crush force may also be variably adjusted along the length of the energy absorbing structure 52.

It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A morphing energy absorber system for a vehicle, comprising:

an energy absorbing structure including an outer housing; and an actuator system configured to morph said energy absorbing structure by selectively elongating said outer housing along at least one of a first direction or a second direction, the first direction being angled relative to the second direction, the actuator system including a first actuator and a second actuator, the first actuator and the second actuator being located within the outer housing, the first actuator being configured to morph the energy absorbing structure to a first morphed state in which the outer housing is elongated along the first direction, and the second actuator being configured to morph the energy absorbing structure to a second morphed state in which the outer housing is elongated along the second direction, the energy absorbing structure and the actuator system being configured such that:

in a non-morphed state, the energy absorbing structure provides a first maximum amount of energy absorption along the first direction;

in the first morphed state, the energy absorbing structure provides a second maximum amount of energy absorption along the first direction, the second maximum amount of energy absorption being greater than the first maximum amount of energy absorption; and in the second morphed state, the energy absorbing structure provides a third maximum amount of energy absorption along the first direction, the third maximum amount of energy absorption being less than the first maximum amount of energy absorption.

2. The system as recited in claim 1, further comprising a controller operable to control said actuator system.

3. The system as recited in claim 1, wherein the first actuator is a vertical actuator, and wherein the second actuator is a horizontal actuator.

4. The system as recited in claim 1, wherein said actuator system is manufactured of an active material.

5. The system as recited in claim 4, wherein said active material includes a shape memory alloy.

6. The system as recited in claim 4, wherein the outer housing is substantially circular in cross-section in the non-morphed state.

7. The system as recited in claim 6, wherein the outer housing is substantially oval in cross-section in at least one of the first morphed state or the second morphed state.

8. A vehicle structure, comprising:

a trim panel;

an energy absorbing structure adjacent to said trim panel, the energy absorbing structure including an outer housing; and an actuator system configured to morph said energy absorbing structure by selectively elongating said outer housing along at least one of a first direction or a second direction, the first direction being angled relative to the second direction, the actuator system including a first actuator and a second actuator, the first actuator and the second actuator being located within the outer housing, the first actuator being configured to morph the energy absorbing structure to a first morphed state in which the outer housing of is elongated along the first direction, and the second actuator being configured to morph the energy absorbing structure to a second morphed state in which the outer housing is elongated along the second direction, the energy absorbing structure and the actuator system being configured such that:

in a non-morphed state, the energy absorbing structure provides a first maximum amount of energy absorption along the first direction;

in the first morphed state, the energy absorbing structure provides a second maximum amount of energy absorption along the first direction, the second maximum amount of energy absorption being greater than the first maximum amount of energy absorption; and in the second morphed state, the energy absorbing structure provides a third maximum amount of energy absorption along the first direction, the third maximum amount of energy absorption being less than the first maximum amount of energy absorption.

9. The vehicle structure as recited in claim 8, wherein said energy absorbing structure is located between said trim panel and an inner panel of a vehicle door.

10. The vehicle structure as recited in claim 8, wherein the first actuator is a vertical actuator and wherein the second actuator is a horizontal actuator.

11. The vehicle structure as recited in claim 10, wherein said energy absorbing structure at least a partially defines a crush space.

12. The vehicle structure as recited in claim 11, wherein the outer housing is substantially circular in cross-section in the non-morphed state and substantially oval in cross-section in at least one of the first morphed state or the second morphed state.

13. The vehicle structure as recited in claim 12, wherein the energy absorbing structure is morphed in the first morphed state for a first occupant, and wherein the energy absorbing structure is morphed in the second morphed state for a second occupant.

14. A method of morphing a crush space within a vehicle, the vehicle including an energy absorbing structure, the energy absorbing structure including an outer housing and an actuator system, the actuator system including a first actuator and a second actuator, the first actuator and the second actuator being located within the outer housing of the energy absorbing structure, the first actuator being configured to morph the energy absorbing structure to a first morphed state in which the outer housing is elongated along a first direction, the second actuator being configured to morph the energy absorbing structure to a second morphed state in which the outer housing is elongated along a second direction, the first direction being angled relative to the second direction, the energy absorbing structure and the actuator system being configured such that:

in a non-morphed state, the energy absorbing structure provides a first maximum amount of energy absorption along the first direction;

in the first morphed state, the energy absorbing structure provides a second maximum amount of energy absorption along the first direction, the second maximum amount of energy absorption being greater than the first maximum amount of energy absorption; and in the second morphed state, the energy absorbing structure provides a third maximum amount of energy absorption along the first direction, the third maximum amount of energy absorption being less than the first maximum amount of energy absorption, the method comprising:

morphing the energy absorbing structure from the non-morphed state to one of the first morphed state or the second morphed state.

15. The method as recited in claim 14, further comprising:

activating an actuator system within the energy absorbing structure.

16. The method as recited in claim 14, wherein the outer housing has a substantially circular cross-section in the non-morphed state, and wherein the outer housing has a substantially oval cross-section in the first morphed state and the second morphed state.

17. The method as recited in claim 16, further comprising: orienting the oval cross-section in a horizontal direction.

18. The method as recited in claim 16, further comprising: orienting the oval cross-section in a vertical direction.

19. The method as recited in claim 16, wherein morphing the energy absorbing structure is performed with respect to an occupant characteristic.

20. The system as recited in claim 1, wherein the first direction is substantially perpendicular to the second direction.

21. The vehicle structure as recited in claim 8, wherein the first direction is substantially perpendicular to the second direction.

22. The method as recited in claim 14, wherein the first direction is substantially perpendicular to the second direction.

\* \* \* \* \*

UNITED STATES PATENT AND TRADEMARK OFFICE
CERTIFICATE OF CORRECTION

PATENT NO. : 9,550,466 B2
APPLICATION NO. : 14/197466
DATED : January 24, 2017
INVENTOR(S) : Umesh N. Gandhi It is certified that error appears in the above-identified patent and that said Letters Patent is hereby corrected as shown below:

In Claim 8, Column 5, Line 61, delete "of".

Signed and Sealed this
Twenty-fourth Day of April, 2018

Andrei Iancu
*Director of the United States Patent and Trademark Office*